No. 886,794. PATENTED MAY 5, 1908.
E. L. GILMORE.
FISH HOOK.
APPLICATION FILED JAN. 4, 1908.
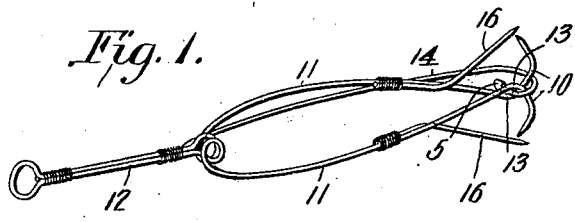
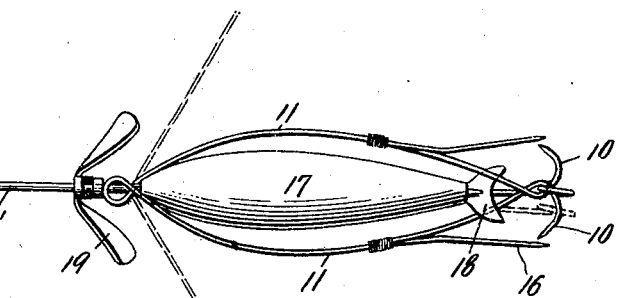
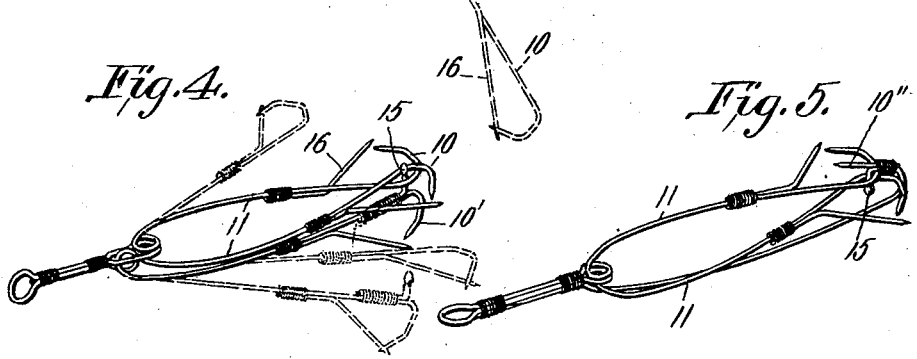
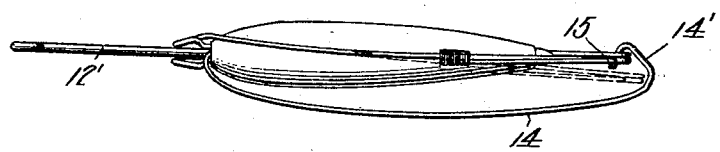
Witnesses
Inventor
E. L. Gilmore,
By Beeler & Robb
Attorneys

UNITED STATES PATENT OFFICE.

EDWARD L. GILMORE, OF YOUNGSTOWN, OHIO, ASSIGNOR OF ONE-HALF TO DAVID F. ANDERSON, OF YOUNGSTOWN, OHIO.

FISH-HOOK.

No. 886,794.      Specification of Letters Patent.      Patented May 5, 1908.

Application filed January 4, 1908. Serial No. 409,296.

*To all whom it may concern:*

Be it known that I, EDWARD L. GILMORE, a citizen of the United States, residing at Youngstown, in the county of Mahoning and State of Ohio, have invented certain new and useful Improvements in Fish - Hooks, of which the following is a specification.

This invention relates to fish hooks, and especially that kind of hooks which are adapted especially for long distance casting for catching game fish.

Among the several objects of the invention are to provide a hook of such a nature that it will automatically spring or snap into the walls of the fish's mouth, regardless of the direction or particular point of the length of the hook in or of which the fish bites; to provide an improvement in fish hooks which includes a novel form of weed guard, and to generally improve this class of tackle with reference to its employment with artificial bait.

For a full understanding of the invention, including its advantages and mode of operation, reference is to be had to the following detail description and the accompanying drawings, in which Figure 1 is a perspective view of a simple and preferred form of my invention, the same being illustrated in set or locked position; Fig. 2 is a vertical elevation of a form of the invention similar to that of Fig. 1, shown in connection with an artificial minnow and spoon, said figure indicating in full lines the position of the parts when set and in dotted lines the position the hooks tend to take or assume when sprung; Fig. 3 is a view of the mechanism illustrated in Fig. 2 taken at right angles thereto, and indicating particularly the peculiar operation of the trigger with respect to the hooks when the latter are being released, and Figs. 4 and 5 are perspective views of slightly modified forms of the invention to be hereinafter described.

Similar parts are referred to in the following detail description and indicated on the drawings by the same reference characters.

Stated generally my present invention involves the employment of a plurality of hooks having spring shanks, and which are adapted to be drawn toward each other against the tension of the springs and to be set and locked in such position by a lock or trigger. When the hook is struck or bitten by the fish either the hooks or the trigger, or both the hooks and the trigger, are operated upon whereby the interlocking means are released, allowing the hooks to quickly and forcibly separate under the tension of their springs and snap into the walls of the fish's mouth.

While the invention thus far described in its general aspects is adapted for the use of hooks of the common barbed form, I have found it to be peculiarly adapted in connection with a novel form of barbless hook. The prong or spike which takes the place of the barb in the kind of hooks known as barbless hooks, in my improvement, serves a peculiar and novel function. When the hook is set in use the prong or spike serves effectively as a weed guard or a means to prevent the hook from catching into grass, weeds, and roots or the like, when trolling, and also after the hook is sprung said guard serves the important function of the barb to prevent the loss of the fish.

As indicated in Fig. 1 my improvement consists of a device comprising a plurality of spring actuated hooks 10 having flexible and elastic stems 11. Said stems are secured to the main stem 12 of the device at one end, and the hooks 10 are adapted to be drawn to such a position that the backs 13 will lie in a position adjacent to each other slightly overlapping each other, where they will be held in said position by any suitable means. The hooks when in set position will be under the tension of the spring stems 11, the force of the springs tending normally to cause the hooks to fly outwardly away from each other. As a suitable and convenient means for locking the hooks in set position I provide a trigger 14, lying preferably in a plane at a right angle to the plane of hooks 10. The point of the trigger which coöperates with the backs 13 of the hooks may be of any suitable form or length. In this figure the point 15 is bent inwardly upon itself and toward the main arm of the trigger 14. Each of the flexible stems 11 has permanently secured thereto the guard member 16, of such length and form as to provide for its hook 10 an effective weed guard when the hook is in set position as illustrated in Fig. 1. This position of the guard 16 with relation to the point of the hook 10 is effected by reason of the distortion of the stem 11 between the point of attachment of the guard 16 and the back 13 when the hook is placed under tension in setting. When, however, the hook is sprung the guard occupies such a position with relation to the point of the hook that it serves only as a substitute for a barb in preventing the loss of the fish. With the device set in the position indicated in this figure, and baited by any desired form of bait such as live or artificial bait, upon being struck or bitten by a fish at any point or direction, as upon the sides of the stems 11 or upon the arm of the trigger 14, tending to cause any or all of these parts to move toward the central axis of the device, the point 15 of the trigger will release the hooks 10 allowing them to snap forcibly outward under the tension of their springs and into the walls of the fish's mouth. This character of a fish hook being useful to a great extent in long distance casting, when it is difficult or even impossible for an angler to possess such control of his line as will be necessary for him to manipulate his line so as to successfully hook and land his game, the advantages of the construction herein illustrated will be appreciated for the reason that the hook is entirely automatic in its operation, due to the bite of the fish.

In the adaptation of the invention as illustrated in Figs. 2 and 3, there is shown in connection with the mechanism above described a conventional form of artificial minnow 17, having a tail piece 18. The stems 11 of the hooks are secured substantially at the head end of the minnow to the stem 12', and upon which may be mounted for rotation a suitable form of spoon 19. As shown most clearly in Fig. 2 these hooks 10 and stems 11 thereof form when set substantially an ellipse, and the said stems forming an ellipse lying substantially parallel with the outlines of the minnow and at a slight distance therefrom. Upon compression of the stems 11 toward the body of the minnow, it is necessary that the structure will permit of ready disengagement of the locking means, in order to prevent the limited movement of the stems 11 from defeating the object of the device. As indicated in Fig. 3 it will be noted that the portion 14' of the trigger is substantially straight and lies at an acute angle to the main arm of the trigger, and that the point 15 is comparatively short. As indicated in dotted lines in Fig. 3, upon compression of the stems 11, the ellipse will elongate and the hooks 10 will slide upon the inclined portion 14' of the trigger causing thereby positive release from the point 15. In this connection it is to be noted that the tail piece 18 plays an important part in effecting such release, it being preferable in setting the device to so arrange the hooks 10 as to cause the hooks to lie either on opposite sides of the tail piece or on the same side thereof as the main portion of the trigger 14, otherwise a slight movement of the trigger arm might permit of too much lateral movement of the hooks before the device would be sprung. Fig. 2 indicates plainly in dotted lines the position the hooks tend to take when sprung, and especially the relative positions of the hook 10 and its guard member 16 when sprung.

The form of the invention indicated in Fig. 4 is one in which there is employed in addition to the hooks 10 similar to those above described, a third hook 10' carried by the trigger arm. Or in other words this device may be considered as having three hooks, and the trigger being carried by one of the hooks. The point 15 in this case coöperates with the hooks 10 in substantially the same manner as heretofore stated. As indicated each hook in this form may be provided with a guard member 16, whose function and mode of operation will be the same as above indicated. In setting this device the hooks 10 will be brought with their backs adjacent to each other slightly overlapping and then the hook 10' will be drawn inwardly against the tension of its spring, bringing the point 15 into locking engagement with said hooks 10. Upon the event of inward pressure of the stems 11 as by the bite of a fish the point 15 will be released, allowing all three of the hooks to fly outwardly away from the main axis of the device.

The modification illustrated in Fig. 5 resembles that of Fig. 4 in that there are employed three hooks, but the hook 10'' which carries the locking point 15 operates in a direction opposite to that in which the hook 10' of the preceding figure operates. It will be noted also that in this form of the device pressure upon the stem of the third hook as well as pressure upon the stems of the main hooks will serve to spring the device.

It is to be observed that the trigger or locking means in all forms of the improvement comprises a spring arm of substantially the length of the hooks and carrying a locking point lying normally, when sprung, by virtue of said spring, outside of the plane of the main hook arms, and the tendency of such spring is to carry the locking point in the direction required to release the hooks. Said trigger arm lies and is movable in a plane at any angle, usually a right angle, from the plane of the main hooks, and in setting the device the locking point is pressed toward the plane of the hooks and practically into the central axis of the device where it is held by the tension of the hooks interlocking therewith. In its normal position each hook has a shank or stem which is substantially straight throughout its length but which terminates in a bend as usual to form the hook proper. In setting the device the bends of the several coöperating hooks slightly overlap and the point of the trigger interlocks therewith by passing laterally into said bends thus overlapped.

Having thus described the invention what is claimed as new is:—

1. A fishing device comprising, in combination, a plurality of spring actuated hooks disposed for operation in a certain plane, the shanks of the hooks being normally straight and terminating in bends to form the hooks proper and having their points directed outwardly from each other, and a pointed trigger disposed in a plane at an angle to the aforesaid plane, the point of the trigger being adapted to enter the aforesaid bends of the hooks to hold the hooks in set position against the tension of their springs.

2. A fishing device comprising, in combination, a plurality of coöperating hooks having flexible elastic stems forming in one position substantially an ellipse, the backs of the hooks being adjacent to each other at one end of the ellipse when in said position, and a trigger having a locking point to engage the hooks to hold them in set position, said point being disengaged from the hooks upon elongation of the ellipse to permit them to spring outwardly.

3. The hereindescribed fishing device comprising the combination of an artificial minnow having a tail piece, a plurality of hooks, and a trigger having a point to hold the said hooks in locked position, said tail piece preventing lateral movement of the hooks and thereby coöperating with the trigger to facilitate release of the hooks when the device is engaged by a fish.

4. In combination, a fish hook having a flexible spring stem, a guard secured to said stem intermediate of its ends, and means to hold the hook in such position relatively to the guard that the latter will normally protect the point of the hook from outside interference.

5. In combination, a fish hook and a guard member therefor, said hook and member being capable of occupying different relative positions, said guard member serving in one position as a weed guard and in another position as a barb.

6. In combination, a plurality of fish hooks having flexible stems, a guard secured to the stem of each hook, and means to lock the hooks in position whereby the flexibility of their stems will cause the said guards to project beyond the points of the hooks.

7. In combination, an artificial minnow having a tail piece, a plurality of hooks whose stems are secured at one end of the minnow, and a hook-engaging trigger lying and movable in a plane at an angle to the plane of the hooks and having a short straight portion lying at an acute angle to the main portion of the trigger and against which straight portion the hooks slide when pressure is applied to cause the hook stems to approach the body of the minnow.

8. In a fishing device the combination of a plurality of spring actuated hooks, a trigger having an inwardly bent point for holding the hooks in set position, and a tail piece adapted to lie between said hooks and coacting with said trigger to facilitate release of the hooks therefrom.

9. In a fishing device, the combination of a plurality of spring actuated hooks, means for holding said hooks in set position, and a tail-piece arranged between the hooks and coöperating with the holding means to increase the effectiveness thereof in releasing the hooks for outward movement.

10. In a device of the character set forth, the combination of a plurality of spring hooks movable in a certain plane, a spring locking arm of substantially the same length as the hooks, and a locking point carried thereby and movable in a plane at a right angle to the aforesaid plane, the said point lying normally outside of the first mentioned plane and movable thereinto against the tension of the spring of the locking arm in setting and there interlocking with the said hooks and holding the same in set position by the tension of the latter.

In testimony whereof I affix my signature in presence of witnesses.

EDWARD L. GILMORE.

Witnesses:
   DAVID F. ANDERSON,
   C. H. DENISON,
   C. W. JUSTICE.